United States Patent

Harrison et al.

[11] Patent Number: 4,909,577
[45] Date of Patent: Mar. 20, 1990

[54] WHEEL SKID CORRECTION DEVICE FOR VEHICLE BRAKING SYSTEM

[75] Inventors: Anthony W. Harrison, Birmingham; Philip A. Taft, West Midlands, both of England

[73] Assignee: Lucas Industries public limited company, Birmingham, England

[21] Appl. No.: 273,073

[22] Filed: Nov. 18, 1988

[30] Foreign Application Priority Data

Nov. 20, 1987 [GB] United Kingdom ............... 8727298
Nov. 20, 1987 [GB] United Kingdom ............... 8727291
Nov. 20, 1987 [GB] United Kingdom ............... 8727295

[51] Int. Cl.⁴ ............................................. B60T 8/32
[52] U.S. Cl. ................................. 303/115; 188/181 A
[58] Field of Search ............... 303/115, 113, 117, 68, 303/69, 61, 63, 110, 105; 188/181 A, 181 R, 181 C

[56] References Cited

U.S. PATENT DOCUMENTS

| | | | |
|---|---|---|---|
| 3,420,580 | 1/1969 | Dymond | 303/116 |
| 3,486,800 | 12/1969 | Ayers, Jr. | 303/115 |
| 3,495,882 | 2/1970 | Stelzer | 303/115 |
| 3,512,844 | 5/1970 | Stelzer | 303/115 |
| 3,515,440 | 6/1970 | Every et al. | 303/115 |
| 3,549,210 | 12/1970 | Birge et al. | 188/181 A X |

FOREIGN PATENT DOCUMENTS 0192657 11/1984 Japan ............................ 303/115
2188111 9/1987 United Kingdom ........... 303/115

Primary Examiner—Douglas C. Butler
Attorney, Agent, or Firm—Staas & Halsey

[57] ABSTRACT

A combined brake release solenoid valve and motor driven debooster has a plunger forming part of the debooster, which, on brake re-application is moved to a flow-restricting position in which there is only a restricted connection between the brake master cylinder and the slave cylinder, so as to avoid over-rapid brake re-application. In one embodiment, the plunger is positioned to provide a stop for the solenoid valve. In another embodiment, the plunger coacts with a separate valve seat.

19 Claims, 4 Drawing Sheets

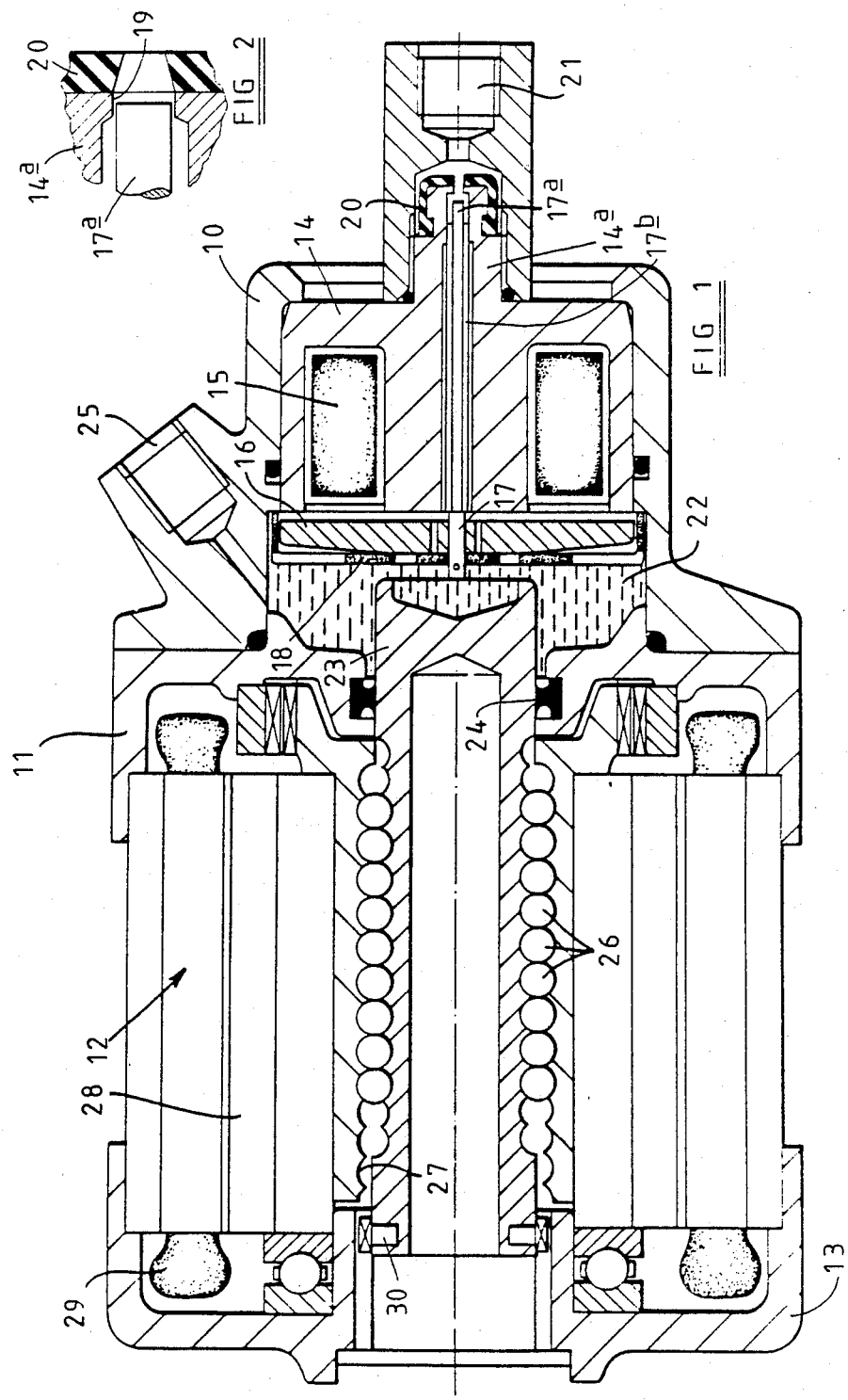

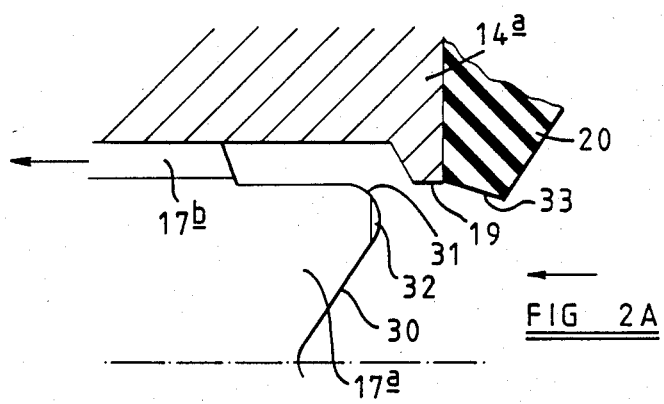
FIG 2A
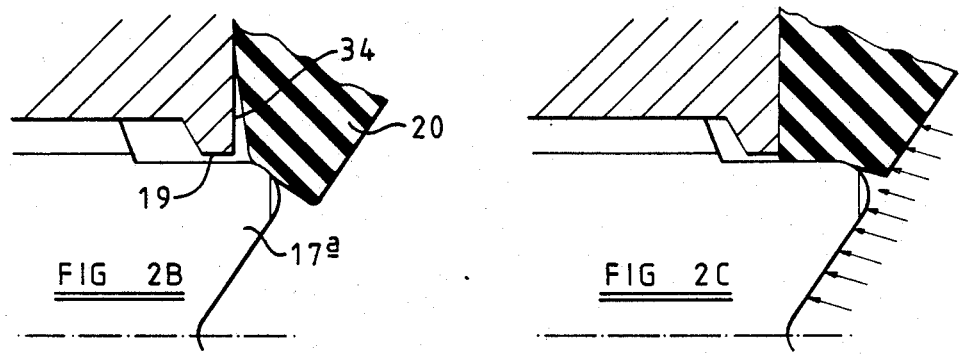
FIG 2B
FIG 2C
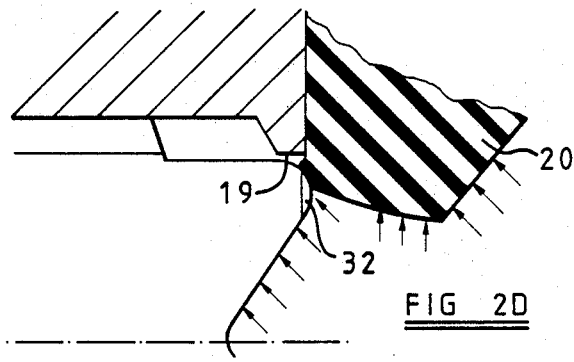
FIG 2D

WHEEL SKID CORRECTION DEVICE FOR VEHICLE BRAKING SYSTEM

BACKGROUND OF THE INVENTION

This invention relates to anti-skid braking systems for vehicles.

Systems are already well known for detecting wheel deceleration during braking and releasing the brake on a wheel which is decelerating too rapidly. Brake release is achieved by closing a valve which is included in the connection between an hydraulic master cylinder and a slave cylinder and simultaneously actuating a de-booster device which increases the volume of the part of the connection between the valve and the slave cylinder, operation of the system taking place under the influence of an anti-skid controller.

With such a system a problem can arise at the time of brake re-application after recovery of the wheel from its slip, particularly when the wheel is travelling across a surface of which the coefficient of friction is increasing as the wheel travels, e.g. when passing from a wet road area to a dry one. When re-application is instructed by the anti-skid controller, the de-booster is deactuated and the valve is re-opened. At this time, the master cylinder pressure is very significantly higher than the slave cylinder pressure and the sudden fluid inrush which occurs when the valve opens can cause the wheel deceleration to be raised above the threshold, thereby triggering another anti-skid release cycle.

SUMMARY OF THE INVENTION

The present invention has for its object to provide an anti-skid braking system in which this problem is alleviated or avoided.

A vehicle anti-skid braking system in accordance with the invention comprises wheel speed sensing means, a valve acting, when closed, to block the connection between master and slave cylinders of the brake system, brake release means comprising a motor, a de-booster device drivingly connected to said motor and operating on actuation thereof to increase the volume of the connection between the valve and the slave cylinder, and flow restricting means operable by the de-booster device to provide a restricted connection between the master and slave cylinders; and a controller connected to said sensing means, said valve and said motor and operating to close the valve and cause the motor to drive the de-booster device to a de-boost position when an incipient skid is detected and, on detection of a cessation of said skid, to permit the valve to open and to cause the motor to drive the de-booster device initially to a "restrict" position in which said flow restricting means is operative and then to a dwell position in which said flow restricting means is not operative.

The valve, the motor and the de-booster device may be mounted in the same body, with the valve having a port opening directly into a chamber in the body and forming part of said connection, the de-booster device acting within said chamber to increase the volume of said connection.

The valve may be of the general kind having an annular seat and a valve member which is in sealing relationship with the internal surface of the seat in the closed condition of the valve and is movable axially clear of the seat in order to open the valve, flow means being provided and arranged to become operative, when the valve member reaches a predetermined position of partial withdrawal from the seat, to permit fluid flow to the low pressure side of the seat, and thereby reduce any pressure differential across the seat prior to full withdrawal of the valve member.

The flow restriction means may form a part of the valve, in which case, when the de-booster device is in its "restrict" position opening movement of the valve beyond a flow restricting position is mechanically prevented by the de-booster device.

Alternatively, there may be a restrictor valve formed by the de-booster device and effectively in series with the first-mentioned valve.

BRIEF DESCRIPTION OF THE DRAWINGS

The invention will now be described, by way of example, with reference to the accompanying drawings, in which:

FIG. 1 shows, in cross-section, a combined valve and de-booster device intended for incorporation in one example of a system in accordance with the invention;

FIG. 2 is an enlarged, fragmentary section showing a detail of the valve;

FIGS. 2A, 2B, 2C and 2D are further fragmentary views, to an even larger scale, showing the valve in greater detail and in different operative conditions;

DETAILED DESCRIPTION OF THE PREFERRED EMBODIMENT

Figure 3:
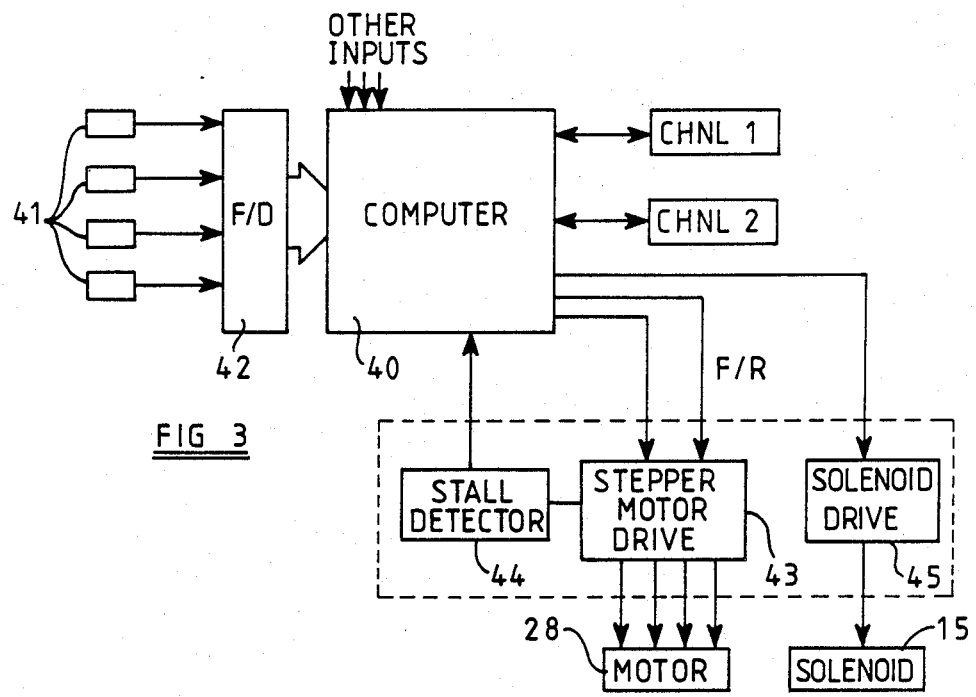
FIG. 3 is a block diagram of an electronic circuit used in the system.

Referring firstly to FIGS. 1 and 2 the combined valve and de-booster device shown comprises a body formed in three parts 10, 11, 12 and 13. The part 10 houses a solenoid valve yoke 14 in an annular recess in which the coil 15 of the solenoid valve is mounted. A disc-shaped armature 16 carried on a stem 17 coacts with the yoke/coil and is supported on a pierced diaphragm spring 18. Mounted on a boss 14a is a flexible valve seat 20 of rubber or a suitable synthetic material, with which a free end 17a of the stem 17 coacts. The stem 17, which is longitudinally fluted at 17b extends through a bore in the yoke 14 and over the greater part of its length is a clearance fit in such bore so as to provide a substantially unrestricted passageway for brake fluid. The seat 20 is mounted on the end of the boss 14a and a section 19 of the bore adjacent the seat 20 is of reduced diameter so that when the free end of the stem is within this section 19 of the bore only a restricted flow of brake fluid can be passed through the valve. The valve, constituted by the valve seat 20 and end 17a of the stem 17, is arranged so that, in its normal rest position the end 17a of the stem is clear (i.e. to the left in the drawings) of the section 19 of the bore so that substantially unrestricted brake fluid flow can occur. When the coil is energized the end 17a of the stem extends through the section 19 and contacts the seat 20.

The valve described above controls fluid flow between a port 21 and a chamber 22 within the body. This chamber is bounded by the valve, the body part 10, the body part 11 and a de-booster device 23 which is in the form of a piston slidable within a sealing ring 24 set in the body part 11. A port 25 communicates with the chamber 22 and is, in use, connected to the slave cylinder of the brake controlled by the channel of the system of which the combined valve and de-booster device forms a part, the port 21 being connected to the brake system master cylinder.

As will be appreciated hereafter, there are times during an anti-skid braking cycle when the valve is sealing between the relatively high pressure in the master cylinder, via port 21, and the temporarily reduced braking pressure present in chamber 22, via port 25. The high pressure differential present across the valve under these conditions can give rise to excessive wear of or possibly damage to the valve seat 20 upon withdrawal of the stem end 17a from the seat. This is because, with some conventional valve designs there is insufficient support for the valve seat at the low pressure side and the "heel" of the seat tends to distort axially each time the valve device opens and can be torn away or at least severely worn by this action.

In order to alleviate this problem, the valve used in the system of the invention is provided with flow means arranged to become operative, when the stem end 17a reaches a predetermined position during its withdrawal from the valve seat 20, to permit fluid flow to the low pressure side of the seat and thereby reduce any pressure differential across the seat prior to full withdrawal of the valve member.

FIGS. 2A to 2D illustrate a preferred form of valve incorporating flow means for the aforesaid purpose.

The forward end face 30 of the stem end 17a is recessed and joined to the longitudinally extending cylindrical surface of the stem by a radiussed portion 31. Around the radiussed portion 31 are formed a plurality of small radially extending grooves 32, the number and circumferential distribution of which may be chosen as required. The internal annular face 33 of the valve seat 20 is bevelled so as to be of progressively decreasing diameter in a direction away from the stem 17.

During operation of the system, described in detail hereafter, the stem end 17a rests, at an initial stage, in the position illustrated in FIG. 2A, disengaged from the seat 20. The stem is required at a subsequent stage to enter the seat 20 and an initial part of this process is illustrated in FIG. 2B in which the stem end is shown in an early stage of contact with the seat 20 with the free end portion 17a of the stem just entering the seat and lifting the latter away slightly from the adjacent end surface 34 of the body. Initial contact between the stem end and seat 20 is on the radiussed surface 31 of the stem, outside the region of the grooves 32. The stem end 17a fitting closely within the bore 19 prevents extrusion of the rubber seat under the external pressure at the right hand side of the seat prior to it being moved away from the surface 34 as shown. As the stem moves further into the seat 20 increasing pressure acting on the exposed surface of the seat causes the seat to spread over the cylindrical surface of the stem end 17a and also to engage once again the surface 34 of the body. In this condition (FIG. 2C), an excellent fluid tight seal is provided around the stem, effectively isolating the port 21 from the chamber 22 of the body.

During a subsequent stage in the operation of the system, as will be explained, it is necessary to reopen the valve by withdrawal of the stem end 17a from the seat 20, in order to re-establish communication between the port 21 and chamber 22. During the initial stages of withdrawal of the stem, the seat 20 returns largely to its initial condition but, because of the large pressure differential to which it is subjected, there is a tendency for the seat material to be extruded into the bore 19 and if this deformation is allowed to continue, rapid severe wear and possible damage to the seat can occur. However, as the stem is further withdrawn by a small amount, the grooves 32 begin to communicate with the bore 19 (FIG. 2D), with the result that pressure equalization occurs at either side of the seal, causing the edge of the seal to spring away from the stem and reassume its free position, as illustrated in FIG. 2A. This action is partly assisted by the radiussed end surface 31 of the stem in which the grooves 32 are formed. The grooves 32 are made sufficiently narrow and deep to ensure that they do not, themselves, constitute extrusion gaps.

The shape, number and positions of the grooves 32 may be varied as required and it may be possible to incorporate these, or other flow means, in the seal instead of or in addition to those in the stem. The valve described is advantageous in minimizing or preventing valve seat distortion and damage due to extrusion under pressure, and thereby contributes to extended seal life.

The de-booster device 23 has an external thread (terminating at a position spaced from the portion of the device 23 which extends through the sealing ring 24) which coacts with an array of bearing balls 26 within an internal screw thread on the rotor 27 of a motor 28. The motor 28 is a power stepper motor, for example a switched reluctance stepper motor. The part 12 of the body forms the stator of this motor and supports the usual windings 29. A key element 30 mounted at the end of the de-booster device 23 engages in an internal axially extending groove in the body part 13 to prevent the de-booster device 23 turning. Thus, when the rotor 27 of the motor is rotated, the de-booster device will be moved axially, thereby varying the volume of the chamber 22.

Turning now to FIG. 3, the electronic circuit shown includes a computer 40, such as a microprocessor, which receives wheel speed data from wheel speed sensors 41 via a suitable frequency to digital converter 42 shared by the sensors 41 in known manner. Various other inputs may be provided to the computer 40 but these are not directly relevant to the present invention and will not be described in detail. The computer controls anti-skid operation of the brakes of the vehicle in which it is installed, by way of a multi-channel arrangement, each channel being controlled in accordance with an associated one or with more than one of the sensors 41. For example there may be a separate channel for each front wheel of the vehicle and a third channel common to the rear wheels.

One channel is shown in detail, but the other two are identical. The computer 40 provides control signals to a stepper motor drive circuit 43 to determine the speed and direction of rotation of the motor 28. Thus, as shown, on one connection from the computer 40 to the drive, a single pulse is sent every time a step is required, whereas the signal at another connection is used to determine the direction of the step. Circuits and software for this purpose are known in this art and will not be described in detail herein. The software is such that, taking into account the motor characteristics and the dynamic load characteristics of the mechanical and hydraulic parts of the system, the frequency and the rate of change of the frequency of the "step" pulses to the motor drive, are prevented from reaching levels at which slip or stall of the motor normally occur, thereby permitting the system to operate open loop in the sense that no actual position feedback from the motor or de-booster device is required. Again such software is known in the stepper motor control art and will not be described in detail herein.

Notwithstanding the above comments, however, and for reasons which will become clear hereinafter, the drive circuit 43 does provide an output to a stall detector 44, which in turn provides an input to the computer 40 to indicate that a stall condition exists.

The computer 40 also provides a control signal to a solenoid drive circuit 45 which controls the solenoid valve independently of the motor drive 43, enabling the master cylinder to be isolated with the minimum of delay upon the occurrence of a skid condition and thereby maximizing the effectiveness of the de-boost action.

The overall operation of the system is as follows:

When the rate of decrease of frequency of the signals from any one of the wheel sensors is found by the software to exceed a threshold value, an anti-skid cycle is commenced. This involves sending a signal to turn on the solenoid drive circuit 45 so as to shut off the valve, and then to send signals to the stepper motor drive 43 to cause the motor to be operated as rapidly as possible to move the de-booster device 23 to the left and thereby rapidly to release the brake on the wheel in question. At a subsequent instant, determined by the software, the brakes are re-applied by running the stepper motor in the opposite direction, to restore brake fluid to the slave cylinder and then re-opening the valve.

Figure 4:
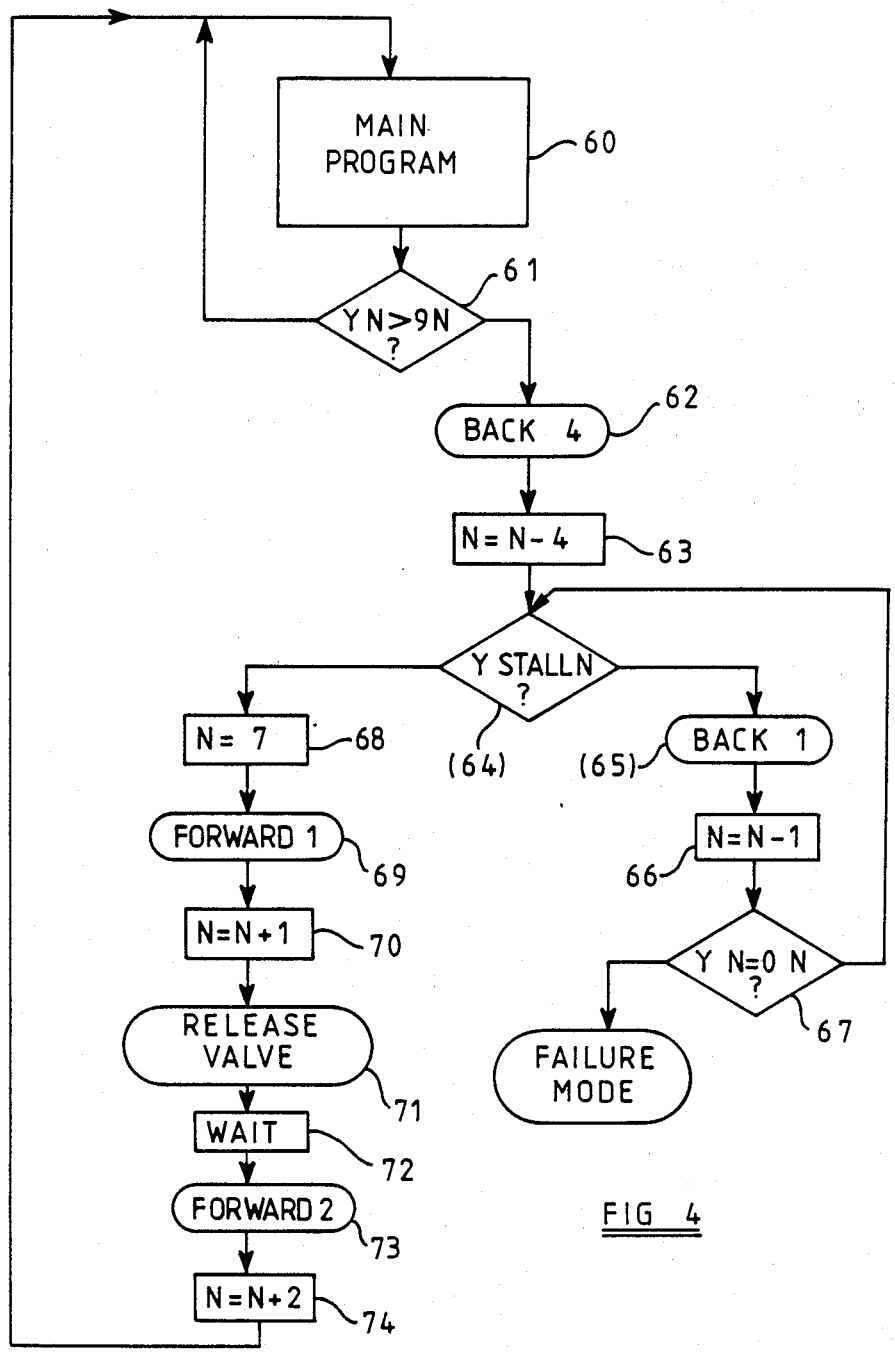
FIG. 4 is a flow chart illustrating a part of a program operated by the system.

It is during this brake re-application phase that the co-action between the valve stem 17 and the portion 19 of the valve bore is used to prevent sudden inrush of brake fluid from the master cylinder to the slave cylinder. FIG. 4 shows a part of the software which controls this. In the following description N is the value held in a software counter representing the current position of the de-booster device 23. In a dwell position of the device 23, this counter holds a relatively low value, such as 10. Each time a pulse is sent to the stepper motor drive circuit 43 during the brake release operation the value N is incremented by one up to a maximum of, say 255. During the brake re-application phase, the value of N is tested by the software once in each cycle of the main control loop 60 to establish whether the value of N exceeds 9 (decision 61). If N>9 then another cycle of the main loop 60 is initiated. When the value of N reaches 9 four step pulses are output (62) to move the device 23 closer to the valve and N is decremented by four (63). The output from the stall detector 44 is then tested (64) to ascertain whether stall has occurred, i.e. whether the device 23 has come into engagement with the diaphragm spring 18. If not, a further pulse is sent (65) to move the device 63 towards the valve and the counter is decremented by one (66). Then a test (67) is made to ascertain if the value of N is zero. If so, the software goes into a "failure" mode, in which the anti-skid braking control is partially or completely inhibited. If not, the routine returns to the "STALL?" test (64).

If a stall is detected during test 64, then, whatever the current value of N, it is reset (68) to a datum value of 7. Then one forward drive pulse is sent (69) to the stepper motor drive circuit 43 and the counter is incremented (70) by one. At this point, the device 23 is positioned close to, but slightly apart from, the spring 18, so that when the valve coil 15 is de-energized (71), the device 23 will prevent complete opening of the valve. Instead, the stem 17 will stop with its end inside the portion 19 of the valve bore, thereby establishing a restricted connection between the master cylinder and the slave cylinder, ensuring that the brake is re-applied at a controlled rate. After a wait (72) (which may be of fixed duration or variable in accordance with some operating variable of the system) two further forward pulses are sent to drive circuit 43 (73) and the counter is incremented by two before the program returns to the main loop. The device 23 is then back at its dwell position with the value of N set at 10.

Figure 5:
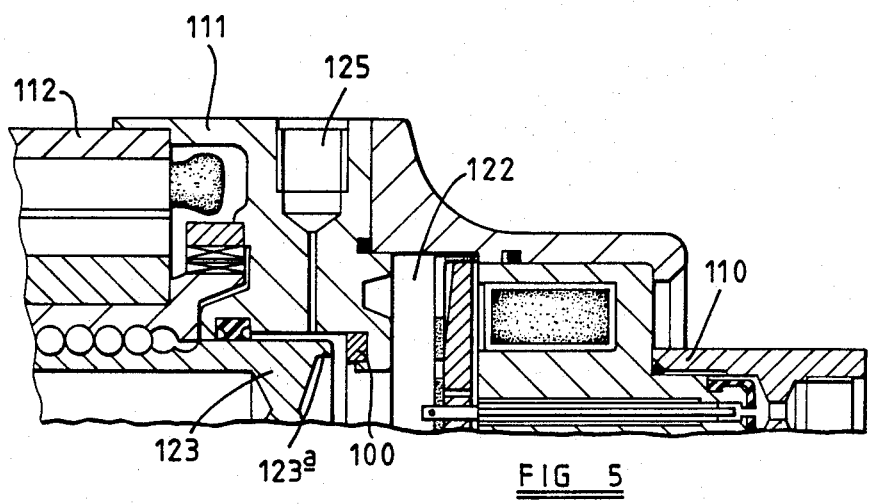
FIG. 5 is a fragmentary cross-sectional view showing another embodiment of the combined valve and de-booster device.

Turning now to FIG. 5, the alternative embodiment of the combined valve and de-booster device shown therein differs from that shown in FIGS. 1 and 2 in that no restricted portion 19 is included in the valve bore and the de-booster device does not form a stop for the valve at brake re-application. Instead a restricted connection between the master and slave cylinders is provided by the de-boost device acting as a restrictor.

To this end an annular valve seat 100 is provided in the body part 111 which corresponds to par 11 in FIG. 1. This valve seat 100 lies between the chamber 122 and the port 125. An annular rib 123a on the end of the de-booster device 123 coacts with the valve seat 100. During the brake re-application stage, the device 123 is moved to the right (as viewed in the drawings) until the rib 123a seats on the valve seat 100. The device 123 is then moved one step to the left to provide the required restricted connection.

It will be appreciated that the software used by the computer can be arranged to position the device 23, 123 initially (i.e. on boot-up) by driving it towards the valve until stopped, and then back three steps to set up the value of N initial. This could also be arranged to take place at other times during operation to ensure that the device 23, 123 is properly positioned and the value of N is correct.

As an alternative to detecting the "motor stalled" condition it is possible to detect when the valve is fully closed by testing the inductance of its coil at the appropriate instant. Thus, in the first described embodiment it would be possible to drive the device 23 towards the valve when the coil is not energized, and detect when the device 23 stops by testing the coil inductance in each cycle of the test loop.

We claim:

1. A vehicle anti-skid braking system comprising:
   wheel speed sensing means;
   a valve driven by electrical valve actuating means for blocking the connection between master and slave cylinders of the brake system;
   brake release means including an electric motor operable independent of the valve actuating means, a de-booster device drivingly connected to said motor and operating on actuation thereof to increase the volume of the connection between the valve and the slave cylinder, and flow restricting means operable by the de-booster device to provide a restricted connection between the master and slave cylinders; and
   an electronic controller connected to said sensing means, said valve actuating means and said motor and outputting first control signals to the valve actuating means to close the valve and second control signals to the motor to drive the de-booster device to a de-boost position when an incipient skid is detected and, on detection of cessation of said skid, to permit the valve to open and to cause the motor to drive the de-booster device initially in one direction to an advanced position in which the de-booster device cooperates with the valve actuating means to operate said flow restricting means and then in the reverse direction to a retracted position in which said flow restricting means is not operative.

2. A system according to claim 1, wherein the valve, the motor and the de-booster device are mounted in the same body, with the valve having a port opening directly into a chamber in the body and forming part of said connection, the de-booster device acting within said chamber to increase the volume of said connection.

3. A system according to claim 2, wherein the flow restricting means comprises a seat within the body, said seat being separate from the valve and the de-booster device co-acting with said seat.

4. A system according to claim 1, wherein the flow restriction means forms part of the valve, said de-booster device acting in its restrict position as a mechanical stop to prevent opening movement of the valve beyond a flow restricting position thereof.

5. A system according to claim 5, wherein the valve includes a longitudinally movable stem extending along a passageway from one end thereof, a seat being provided at the opposite end of the passageway which is engaged by the end of the stem when the valve is closed, said passageway having a portion of reduced cross-sectional area adjacent said seat, the stem being situated within said portion of reduced cross-sectional area when the valve is in said flow restricting position.

6. A system according to claim 1, wherein said motor is a stepper motor and said controller includes means for supplying individual pulses to said stepper motor to cause displacement of said de-booster device.

7. A system according to claim 6, wherein the controller includes means operable on detection of cessation of the wheel slip condition for producing a sequence of pulses for driving the stepper motor to displace the de-booster device away from said de-boost position, means for detecting cessation of such displacement caused by co-action of the de-booster device with position limiting means, and means for causing a predetermined number of pulses to be supplied to the stepper motor to cause it to be reversely driven towards said de-boost position so that said de-booster device occupies its "restrict" position.

8. A system according to claim 1, wherein the de-booster device is a piston and means are provided to convert rotary driving movement of said motor into linear movement of said piston.

9. A system according to claim 1, wherein the valve is actuated by means independent of said motor.

10. A system according to claim 9, wherein the valve is actuated by a solenoid.

11. A system according to claim 1, wherein the valve includes an annular seat and a valve member which is in sealing relationship with the internal surface of the seat in the closed condition of the valve and is movable axially clear of the seat in order to open the valve, flow means being provided and arranged to become operative, when the valve member reaches a predetermined position of partial withdrawal from the seat, to permit fluid flow to the low pressure side of the seat, and thereby reduce any pressure differential across the seat prior to a full withdrawal of the valve member.

12. A system according to claim 11, wherein the flow means is associated with the valve member.

13. A system according to claim 11, wherein the flow means is in the form of one or more recesses formed in end region of the valve member adjacent said seat.

14. A system according to claim 11, wherein the junction between axially and radially extending extreme faces of the valve member adjacent the valve seat is convexly curved.

15. A vehicle anti-skid braking system comprising:
wheel sensing means;
a valve driven by electrical valve actuating means for blocking the connection between master and slave cylinders of the brake system;
brake release means including an electric motor operable independent of the valve actuating means, a de-booster device drivingly connected to said motor and operating on actuation thereof to increase the volume of the connection between the valve and the slave cylinder, and flow restricting means operable by the de-booster device to provide a restricted connection between the master and slave cylinders; and
an electronic controller connected to said sensing means, said valve actuating means and said motor and outputting first control signals to the valve actuating means to close the valve and second control signals to the motor to drive the de-booster deice to a de-boost position when an incipient skid is detected and, on detection of cessation of said skid, to permit the valve to open and to cause the motor to drive the de-booster device initially in one direction to an advanced position in which the de-booster device cooperates with the valve actuating means to operate said flow restricting means and then in a reverse direction to a retracted position in which said flow restricting means is not operative, wherein the de-booster device is a piston and means are provided to convert rotary driving movement of said motor into linear movement of said piston, and wherein said motor is a stepper motor and said controller includes means for supplying individual pulses to said stepper motor to cause displacement of said de-booster device.

16. A combined valve and de-booster device for use in a fluid line of a vehicle anti-skid braking system between a slave cylinder and a master cylinder, the device comprising:
a body having an interior fluid chamber which is in communication with the slave cylinder and the master cylinder;
a valve movable between open and closed positions and shutting off the master cylinder from the fluid chamber in the closed position upon detection of a skid condition;
first means for actuating the valve;
a de-booster element movable in extended and retracted positions into and out of the fluid chamber to alter the volume thereof and thereby vary fluid pressure at the slave cylinder so that when the valve is closed, the de-booster element is moved out of the fluid chamber to release fluid pressure at the slave cylinder;
second means for actuating the de-booster element; and
control means, operatively coupled to the first actuating means for controlling movement of the valve between the open and closed positions, and to the second actuating means for controlling movement of the de-booster device between the extended and retracted position, wherein in the extended position the de-booster cooperates with the valve to hold the valve in a restricted position.

17. A combined valve and de-booster device as claimed in claim 16, wherein the first actuator means is a solenoid having an armature and an axial passageway, and the valve includes a resilient valve seat disposed at one end of the fluid passageway and a valve stem axially movable in the fluid passageway and having one end coupled to the armature and the other end providing a valve element which moves into and out of a seated position with respect to the valve seat.

18. A combined valve and de-booster device as claimed in claim 17, wherein the second actuator means comprises a stepping motor having a rotor which threadedly engages the de-booster element, and wherein the de-booster element includes a key for preventing rotational movement thereof, the de-booster element being axially movable in response to rotation of the rotor and wherein the de-booster element is movable into juxtaposition to the end of the valve stem coupled to the armature for restricting unseating movement of the valve.

19. A combined valve and de-booster device as claimed in claim 16, wherein the second actuator means comprises a stepping motor having a rotor which threadedly engages the de-booster element, and wherein the de-booster element includes a key for preventing rotational movement thereof, the de-booster element being axially movable in response to rotation of the rotor.

* * * * *